(No Model.)　　　　　　　　　　　　　　　　　　　　　3 Sheets—Sheet 1.
R. SOLANO.
POWER BRAKE.
No. 353,175.　　　　　　　　　　　Patented Nov. 23, 1886.
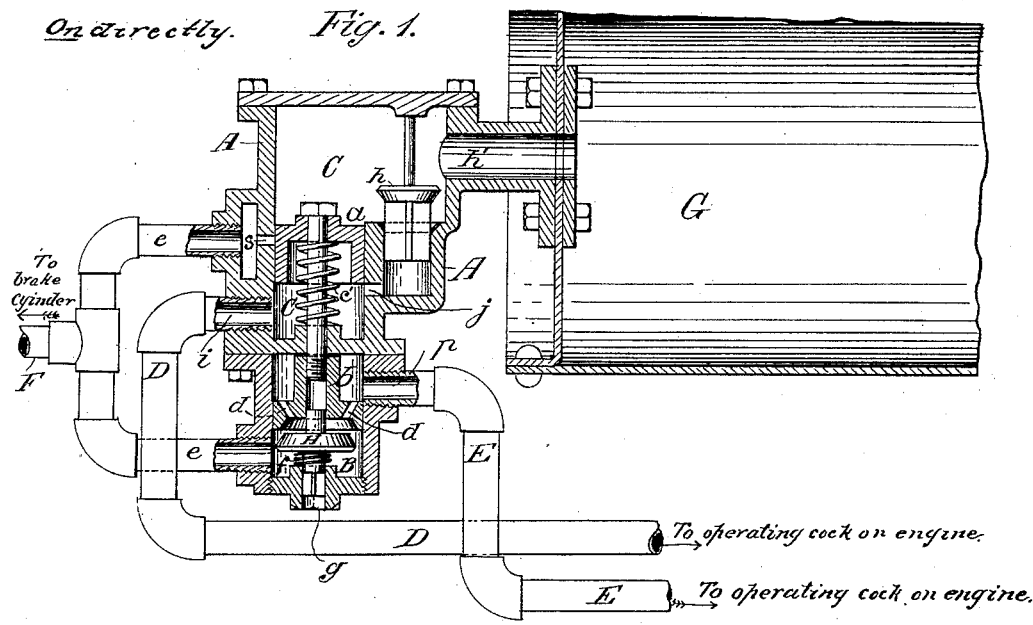
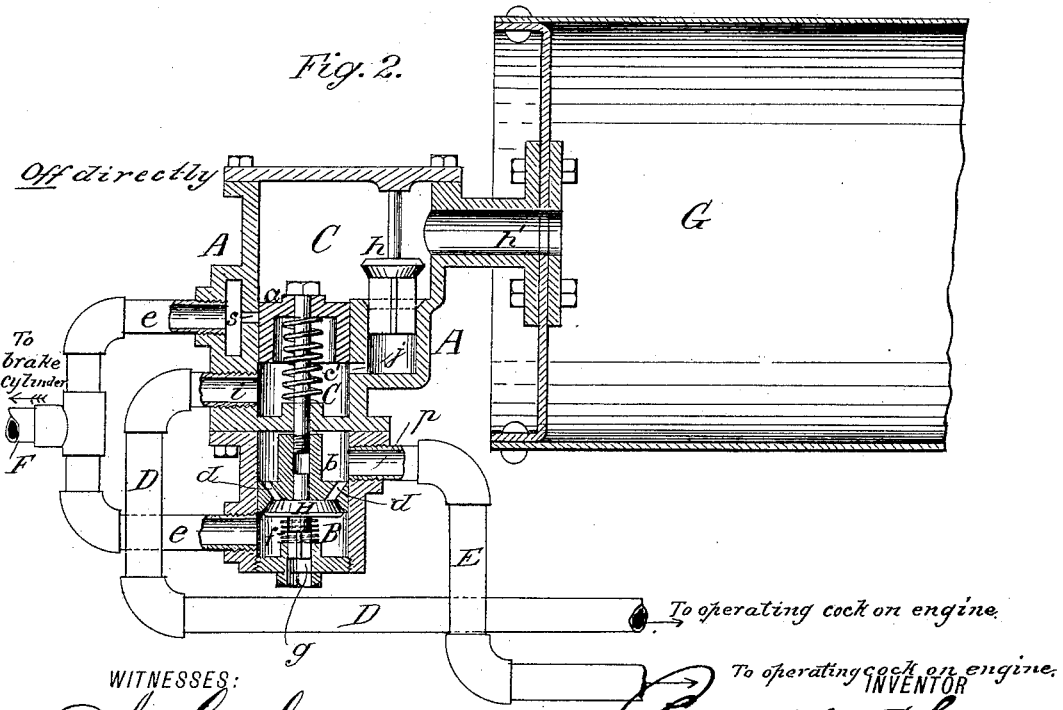
WITNESSES:　　　　　　　　　　　　　　INVENTOR
　　　　　　　　　　　　　　　　　　　Renaldo Solano
　　　　　　　　　　　　　　　　　　BY
　　　　　　　　　　　　　　　　　　Chas. W. Forbes
　　　　　　　　　　　　　　　　　　　　ATTORNEY (No Model.) 3 Sheets—Sheet 2.

R. SOLANO.

POWER BRAKE.

No. 353,175. Patented Nov. 23, 1886.

WITNESSES:
Aug Greveling
W. W. Weston

INVENTOR
Rinaldo Solano
BY
Chas. N. Forbes
ATTORNEY (No Model.) 3 Sheets—Sheet 3.
R. SOLANO.
POWER BRAKE.
No. 353,175. Patented Nov. 23, 1886.
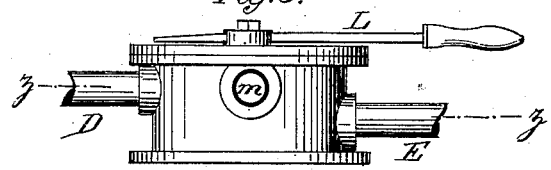
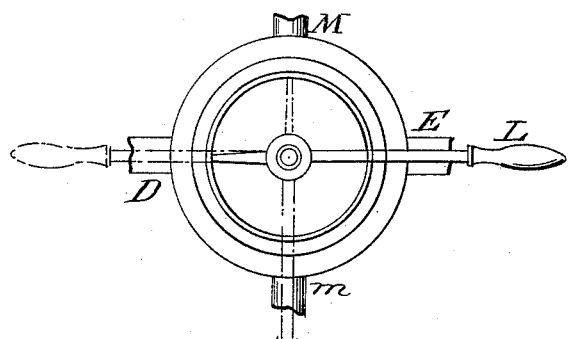
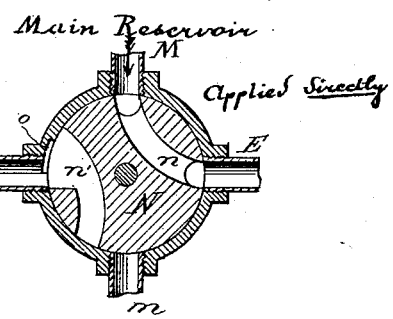
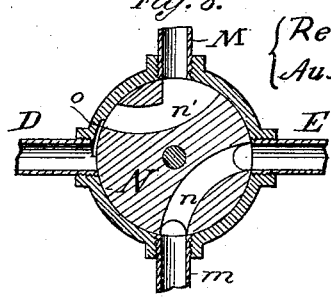
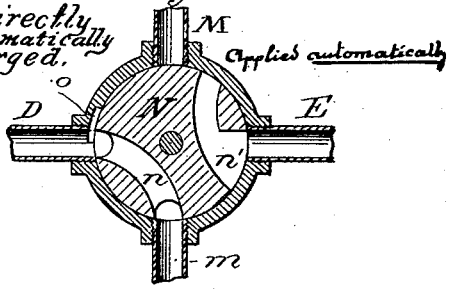
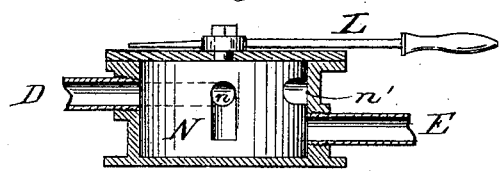
WITNESSES:
Aug Greveling
W. W. Weston
INVENTOR
Renaldo Solano
BY
Chas. N. Forbes
ATTORNEY

UNITED STATES PATENT OFFICE.

RENALDO SOLANO, OF BROOKLYN, NEW YORK, ASSIGNOR OF TWO-THIRDS TO JOHN W. HOWARD AND DAVID R. MORSE, BOTH OF SAME PLACE.

POWER-BRAKE.

SPECIFICATION forming part of Letters Patent No. 353,175, dated November 23, 1886.

Application filed July 29, 1886. Serial No. 209,390. (No model.)

*To all whom it may concern:*

Be it known that I, RENALDO SOLANO, a citizen of the United States, residing at Brooklyn, in the county of Kings and State of New York, have invented a new and useful Improvement in Power-Brakes, of which the following is a specification, reference being had to the accompanying drawings, forming a part of the same, in which—

Figure 3:
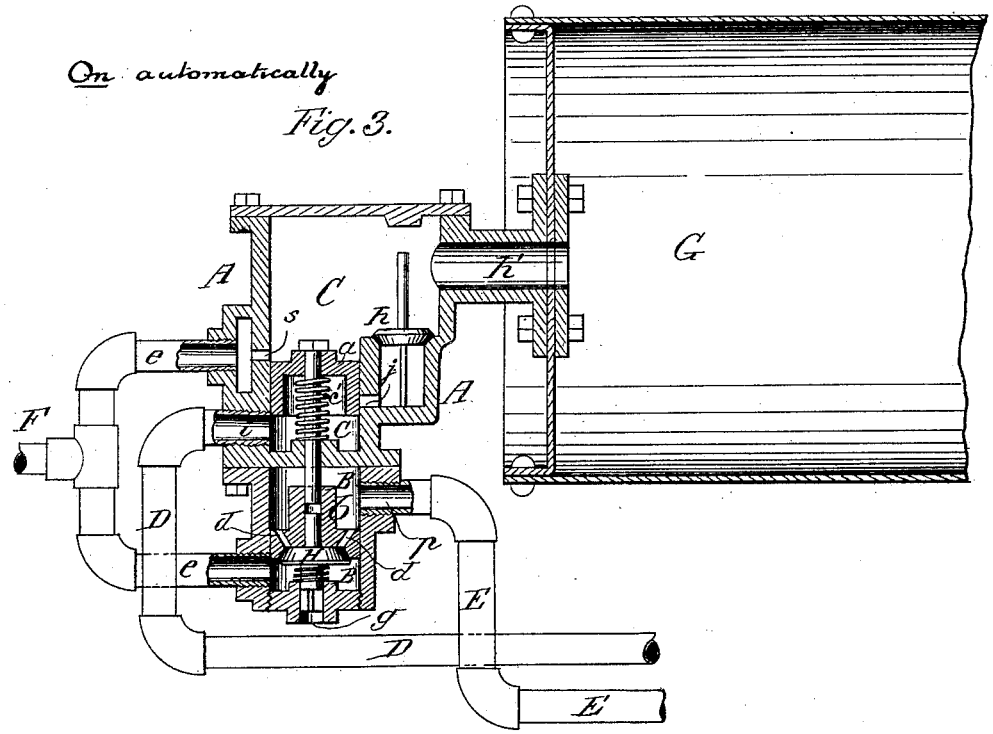
Figure 4:
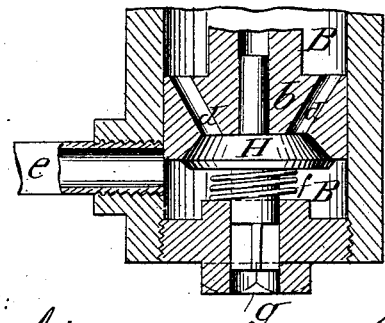

Figure 1 is a sectional view showing the position of the parts when the brake is applied. Fig. 2 is a similar view showing the position of the parts when the brake is released. Fig. 3 is a similar view showing the position of the parts when the brake is automatically applied. Fig. 4 is an enlarged sectional view of the releasing-valve. Fig. 5 is a side view of the case and connected pipes containing the operating cock or valve. Fig. 6 is a plan view of the same. Fig. 7 is a cross-sectional view on the line $z\,z$, Fig. 5, showing the operating-cock in position to apply the brake by hand. Fig. 8 is a similar view showing the position of the cock when the brake is released. Fig. 9 is a similar view showing the position of the cock when the brake is automatically applied, and Fig. 10 a vertical sectional view showing the ports elongated, for a purpose hereinafter explained.

Similar letters of reference indicate corresponding parts in the several figures.

The object of my invention is to combine in one apparatus devices for operating the brake independently and directly at the will of the engineer, and for operating the brake automatically in the event of accident, and to utilize and apply, when necessary, the power reserved for automatic action.

In order that others may understand and use my invention, I will first proceed to describe an apparatus embodying it, and subsequently to point out in the claims its novel characteristics.

In the drawings, A represents a box or casing having two separate chambers, B C, in which the connected piston-valves $a\,b$ reciprocate. These valves are held in the position shown in Figs. 1 and 2 by means of the spiral spring $c'$. The piston-valve $b$ is supplied with ports $d$, that are opened and closed by a valve, H, that also opens and closes the outlet $g$ by means of its depending stem, as shown, the valve being normally held in closed position by the spring $f$. The relative open and closed position of the valve H with respect to the positions of the piston-valves $a\,b$ is shown in Figs. 1 and 2.

D represents a pipe leading from the operating-cock on the engine to the chamber C, below the piston-valve $a$, and provided with flexible connections at the intersection of the cars.

E is also a pipe connecting with the operating-cock on the engine, and with the chambers B above the piston-valve $b$.

F is a pipe that connects the brake-operating devices with the brake-cylinder, and through the branch pipes $e$ with the chambers B and C.

G is an auxiliary reservoir-tank that communicates with the chamber C through the passage $h'$, and is charged with air that is reserved to operate the parts when the brake is applied automatically.

$h$ is a check-valve in the supply-passage to the reservoir G, that prevents the return of the air from the reservoir-tank when charged.

The operating-cock N and its connected parts that are under the control of the engineer are shown in Figs. 5, 6, 7, 8, 9, and 10. This cock is constructed on the principle of the well-known four-way type, its ports $n\,n'$ being turned by the lever L to register at the will of the engineer with the respective pipe-connections M $m'$ D E, to operate the apparatus as desired.

Having now referred to the several parts composing the apparatus, the following description of its operation will readily explain the purpose of such respective parts.

When it is desired to apply the brake directly, the cock N is turned to the position shown in Fig. 7, and the compressed air from the main reservoir flows through the pipe M and port $n$ of the cock into the pipe or conduit E, through inlet $p$ into the chamber B and ports $d$, the valve H being forced from its seat, which closes the escape-opening $g$ and allows the pressure to continue through the branch pipe $e$ and pipe F and to the brake-cylinder, thus operating to apply the brake. To release the brake, the operating-cock N is turned to the position shown in Fig. 8, which allows the pressure to escape from the pipe E through the port n and pipe m to the atmosphere, the back-pressure in the brake-cylinder closing the valve H, which allows the air to escape through the opening g, as shown in Fig. 2. To set and charge the apparatus so that it will operate automatically in the event of accident, the operating-cock N is turned to the position shown in Fig. 8. The air being under compression in the main reservoir on the engine, it flows through the pipe M and port n' into the pipe D, through the inlet i into the chamber C, thus elevating the piston-valve a and entering through the passage j and check-valve h into the communicating reservoir G through the opening h', thus charging the tank G with a reserve pressure, to act to set the brake in case of a rupture of the pipe D. If it be desired to utilize this reserve force to set the brake, the operating-cock N can be turned to the position shown in Fig. 9, which will allow the air to escape from the pipe D and chamber C, beneath the piston-valve a and check-valve h through the port n and air-escape pipe m, as in the case of a rupture of the pipe D. Consequently, there being no pressure under the piston-valve a, the pressure in the reservoir G closes the check-valve h and forces the connected piston-valves a and b downward, which closes the escape-opening g and opens the port s, thus allowing the air from the reservoir G to enter the branch pipe e and pipe F into the brake-cylinder, thus setting the brake.

Upon raising the piston-valves a and b by compressed air through the pipe D the port s will be closed and the passage g opened, which will allow the air-pressure to escape from the brake-cylinder and release the brakes.

It will be observed that the pipe-connections with the operating-cock are arranged at different planes, as shown in Fig. 10, and the valve-port sunk to register alternately with each, the object of this construction being to prevent the escape of air from the main reservoir to the pipe E when releasing the automatic devices with the direct-acting brake off.

It will also be observed that a shallow recess, o, Figs. 7, 8, and 9, is provided to preserve communication to the auxiliary reservoir in all positions of the operating-cock N, except when the brake is applied by the direct-acting devices, at which time such communication is cut off.

In the use of my invention the several applications of the power are instantly effected by a simple and definite movement of a lever, requiring no such alteration, adjustment, or manipulation of cocks or valves common to devices of this character.

In an emergency and application of the automatic devices the whole power is instantly applied to stop the train in the shortest possible time, and in the use of the direct-acting devices perfect control of the train is maintained by the application of little or much power, as desired.

Having thus fully described an apparatus embodying my invention, what I claim, and desire to secure by Letters Patent, is—

1. A power-brake apparatus fitted with a main reservoir, an auxiliary reservoir, and a brake-cylinder provided with two pipes leading from the operating-cock to the valve-chambers that direct the pressure-current, and a single pipe leading from the valve-chambers to the brake-cylinder, whereby pressure is conducted from either source of supply to the brake-cylinder or released therefrom through a single pipe.

2. In a power-brake apparatus fitted with a main reservoir and brake-cylinder, the combination, with an auxiliary reservoir, of two separate valve-chambers and a four-way operating-cock having communicating pipe and port connections, as described, whereby pressure is directly applied to and released from the brake, or automatically by a reserved pressure in the event of accident, the latter force being also capable of application at the will of the engineer.

RENALDO SOLANO.

Witnesses:
CHAS. W. FORBES.
AUG. CREVELING.